Feb. 8, 1966     R. TOMASELLI     3,234,415
INTERMEDIATE SUPPORT FOR THE DYNAMO AND BLOWER
OF AUTOMOTIVE VEHICLES
Filed April 9, 1963     2 Sheets-Sheet 1
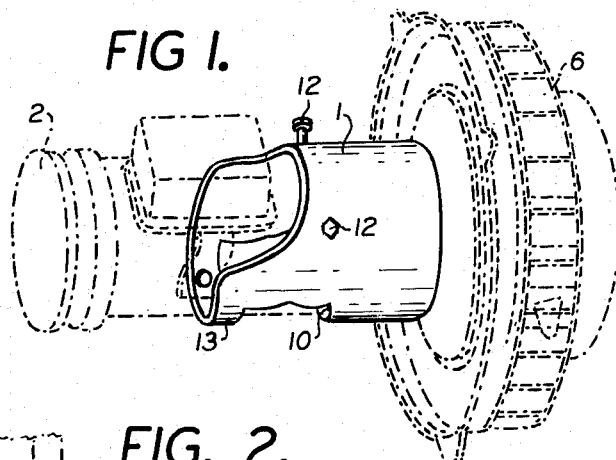
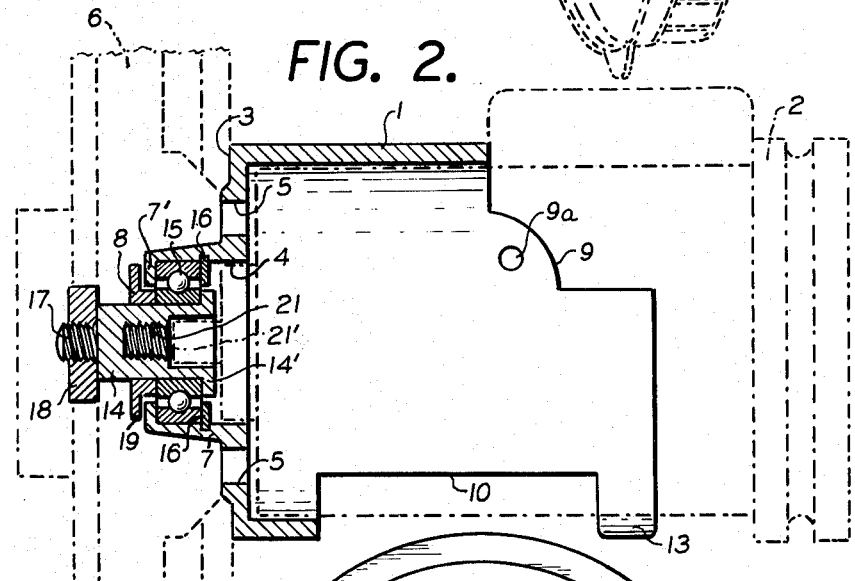
INVENTOR
REMOALDO TOMASELLI
BY
ATTORNEY.

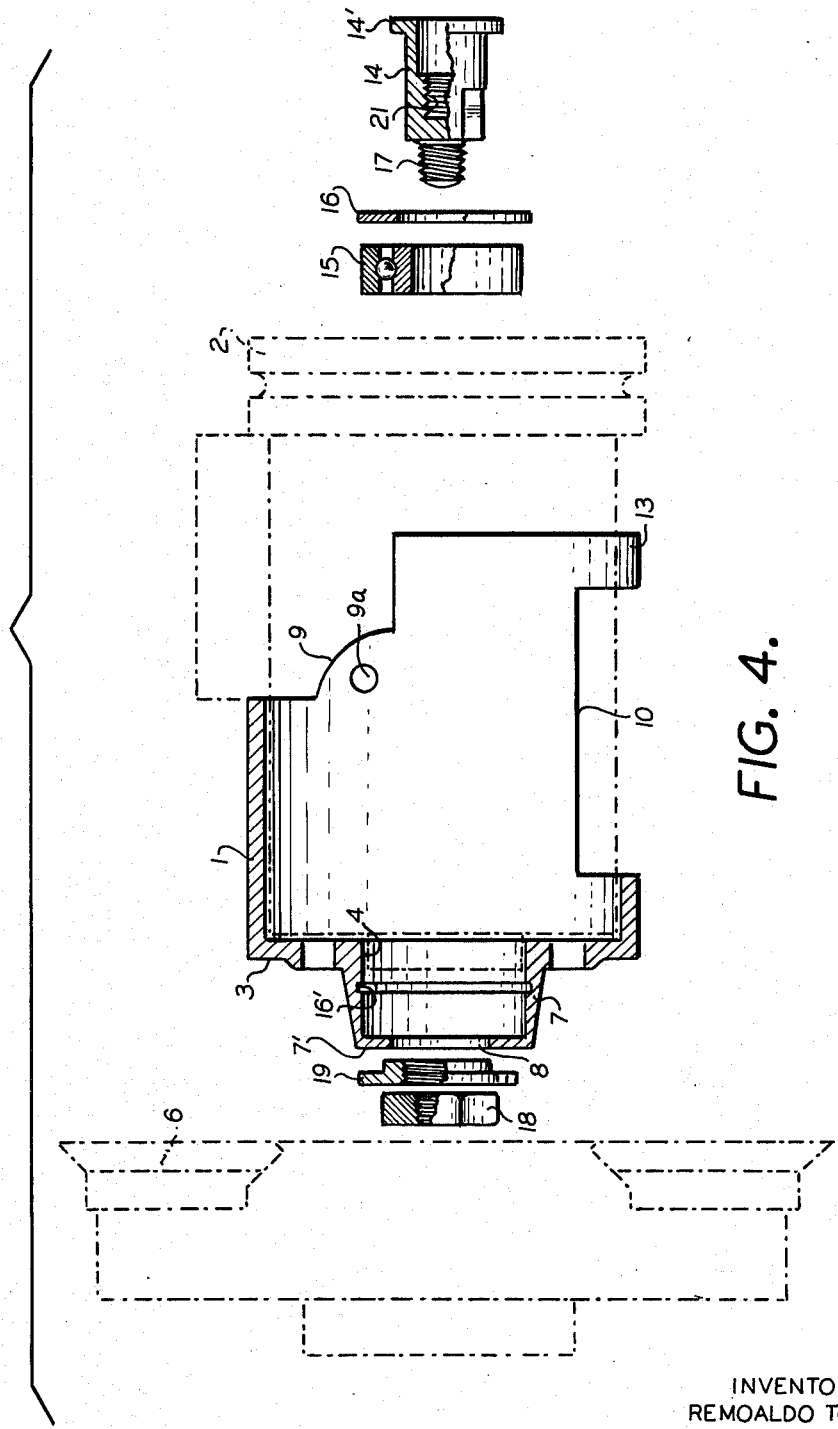

...

United States Patent Office 3,234,415
Patented Feb. 8, 1966

3,234,415
INTERMEDIATE SUPPORT FOR THE DYNAMO AND BLOWER OF AUTOMOTIVE VEHICLES
Remoaldo Tomaselli, Rua Jaoa Antonio de Oliveira 1078, Sao Paulo, Brazil
Filed Apr. 9, 1963, Ser. No. 271,680
Claims priority, application Brazil, Dec. 17, 1962, 145,497
2 Claims. (Cl. 310—91)

The present invention relates to an intermediate support for the dynamo of automotive vehicles.

It is known that a blower is normally secured to a dynamo in automotive vehicles, and in particular is such arrangement found in "Volkswagen" cars. Due to this arrangement, removal of the dynamo either for replacement or for repair required at the same time the removal of the blower. Such arrangement necessitates, therefore, a more cumbersome disassembly and assembly work.

It is, therefore, one object of the present invention to provide an intermediate support for the dynamo of automotive vehicles, which provides a proper support and receives the dynamo and at the same time connects the blower to the intermediate support simultaneously providing an operative connection between the dynamo and the blower. By this arrangement, the dynamo can be removed from the intermediate support and from the blower without removing the blower, which remains supported and operatively connected with the intermediate support upon removal of the dynamo.

With this and other objects in view, which will become apparent in the following detailed description, the present invention will be clearly understood in connection with the accompanying drawings, in which:

FIGURE 1 is a perspective view of the intermediate support, showing in dotted lines the dynamo and also in dotted lines the blower connected to the support;

FIG. 2 is an axial section of the support again showing the blower and the dynamo attached thereto in dotted lines;

FIG. 3 is an end view of the support seen from the blower side; and

FIG. 4 is an exploded view of the support indicating again in dotted lines the dynamo and the blower.

Referring now to the drawings, the intermediate support comprises a substantially cylindrical casing 1, which has a cut-out 9 on its upper portion on the dynamo side and which is equipped at its bottom with a window-like recess 10, which recess 10 is adapted to permit the setting of the casing 1 over the engine (not shown) of the automotive vehicle. The casing 1 is open at its end receiving the dynamo 2, while it has an end wall 3 at the opposite end. The end wall 3 has a circular opening and a cylindrical portion 7 of smaller diameter than that of the main portion of the casing 1 which projects from the opening of the end wall 3 to terminate in an inwardly directed flange or ring portion 7'.

As can be ascertained from FIG. 3 of the drawings, the crosswall 3 is equipped with bores 20, which are adapted to secure the blower casing associated with impeller 6 to the casing 1 by means of suitable bolts (not shown).

Referring now to FIGS. 2 and 4 of the drawings, a bearing 15 is first inserted into the cylindrical portion 7 of smaller diameter to be put into engagement with the inner face of the flange 7' of the cylindrical portion 7 of smaller diameter. A split ring 16 is then inserted into the cylinder 7, which split ring 16 is set into and received in an annular groove 16' provided on the inner face of the cylindrical portion 7, whereby to locate and secure the ball bearing 15 in its position in the cylindrical portion 7.

Finally, a connecting plug 14 is inserted into the casing 1 to engage the inner race of the ball bearing 15 and to project through the opening between the flanges 7' of the cylinder 7, whereupon a ring member 19 is inserted from the outside into the flange 7', the inner diameter of which coincides with the outer diameter of the plug 14, in order to center the plug 14 which projects beyond the ring 19 in outward direction.

The plug 14 has a threaded bore 21 and has at one end flange formations 14'. The opposite end of the plug 14 has a threaded bolt 17 projecting therefrom, which threaded bolt 17 is complementary to the threaded bore 21 in the plug 14 for a purpose to be set forth below. The threaded bolt 17 receives a nut 18 in the mounted position of the plug 14, which secures the plug 14 for joint rotation with the impeller 6.

As shown again in FIG. 3 of the drawings, the end wall 3 is equipped with preferably four openings 3', substantially 90° spaced apart from each other, in order to reduce the weight of the casing 1, as well as to provide cooling for the dynamo 2.

The dynamo 2 is adapted to be inserted at least partly into the casing 1 (as is clearly shown in FIGS. 1 and 2 of the drawings, and the dynamo 2 is equipped with a threaded bolt 21', which has a diameter equal to that of the bolt 17. If no intermediate support is provided, the bolt 21' is connected directly with the blower 6 by securing the nut 18 to the threaded bolt 21' of the dynamo 2. This known structure requires the removal of the dynamo and of the blower, in case the dynamo is to be replaced. By the arrangement of the present invention, it is now possible to have the impeller 6 secured to the casing 1 by means of the plug 14 and by applying the nut 18 to the bolt 17 of the plug 14 in particular, while the dynamo 2 can be taken out of the casing 1 merely by unscrewing the bolt 21' from the threaded bore 21 of the nut 14 without disturbing the mounting of the blower 6.

It is also clearly shown in FIGS. 2 and 4 of the drawings, that the cylindrical portion 7 of smaller diameter has an inner cylindrical face 4 into which, as stated above, the bearing 15 is inserted.

The dynamo 2 can be retained in the casing 1 by means of lateral bores 9a, which are adapted to receive screw-bolts 12. As also clearly shown in FIGS. 2 and 4, the casing 1 is closed at the bottom on the dynamo side by the portion 13 thereof.

It is now quite apparent that according to known structures the dynamo 2 is directly secured and operatively connected to the blower 6 by securing the bolt 21' of the dynamo 2 with the blower 6 by means of the nut 18. By the arrangement of the intermediate support 1, it is possible to connect the bolt 21' of the dynamo 2 to the plug 14 by screwing the bolt 21' into the threaded bore 21 of the plug 14, thereby providing a rotary connection between the dynamo 2 and the plug 14, which in turn by connecting its bolt 17 by means of the nut 18 with the blower 6 provides a rotary connection between the plug 14 and the blower 6. This arrangement permits the removal of the dynamo 2 merely by unscrewing the bolt 21' from the threaded bore 21 of the plug 14 without disturbing the rotary operative connection between the plug 14 and the blower 6.

While I have disclosed one embodiment of the present invention, it is to be understood that this embodiment is given by example only and not in a limiting sense, the scope of the present invention being determined by the objects and the claims.

I claim:
1. An intermediate support for operative connection of a dynamo with a blower in an automotive vehicle comprising a substantially cylindrical casing open at one end and having an end wall at the opposite end, said end wall having a circular opening and a cylindrical portion of a smaller diameter than that of said casing projecting outwardly from said circular opening, said circular portion terminating in an inwardly extending flange portion, a bearing inserted into and fitting into said cylindrical portion, means for retaining said bearing in said cylindrical portion, a substantially cylindrical plug member having a flange formation at one end and a threaded bolt projecting axially from the other end, said plug member having a threaded bore of a diameter complementary to that of said threaded bolt, said threaded bore of said plug member being adapted to receive a threaded bolt of said dynamo and said threaded bolt of said plug being adapted to be received by a threaded bore of said blower, so that said threaded bolt of said dynamo provides a releasable rotary operative connection with said threaded bore of said blower by means of said plug member of said intermediate support.

2. The support, as set forth in claim 1, wherein the inner face of said cylindrical portion has an annular groove, and said means for retaining said bearing in said cylindrical portion comprises a split-ring received in said annular groove and retaining said bearing.

References Cited by the Examiner
UNITED STATES PATENTS 2,512,407  6/1950  Wood _____ 310—91
2,874,985  2/1959  March _____ 287—53

ORIS L. RADER, *Primary Examiner.*

CLAUDE A. LEROY, *Examiner.*

J. PETO, L. L. SMITH, *Assistant Examiners.*